United States Patent
Kumar Agrawal

(10) Patent No.: US 12,481,251 B2
(45) Date of Patent: Nov. 25, 2025

(54) ELECTRONIC DEVICES AND CORRESPONDING METHODS FOR REDIRECTING USER INTERFACE CONTROLS DURING ACCESSIBILITY CONTEXTS

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 588 days.

(21) Appl. No.: 17/949,121

(22) Filed: Sep. 20, 2022

(65) Prior Publication Data

US 2024/0094680 A1 Mar. 21, 2024

(51) Int. Cl.
| | | |
|---|---|---|
| G06F 3/01 | (2006.01) | |
| G04G 9/00 | (2006.01) | |
| G04G 21/00 | (2010.01) | |
| G06F 1/16 | (2006.01) | |
| G06F 3/04847 | (2022.01) | |

(52) U.S. Cl.
CPC ............ *G04G 9/007* (2013.01); *G04G 21/00* (2013.01); *G06F 1/163* (2013.01); *G06F 3/017* (2013.01); *G06F 3/04847* (2013.01)

(58) Field of Classification Search
CPC ....... A61B 8/0833; A61B 8/463; A61B 8/466; A61B 8/483; A61B 8/54; G06T 7/0012; G06T 7/70; G06T 15/08; G06T 2207/10136; G06T 2207/30048

See application file for complete search history.

(56) References Cited

U.S. PATENT DOCUMENTS

| | | | |
|---|---|---|---|
| 9,618,970 B2 | 4/2017 | Lee | |
| 2014/0218289 A1 | 8/2014 | Dai | |
| 2015/0113553 A1 | 4/2015 | Pan | |
| 2016/0006983 A1 | 1/2016 | Makela | |
| 2016/0065831 A1* | 3/2016 | Howard | H04N 23/66 348/211.2 |
| 2016/0110012 A1 | 4/2016 | Yim | |

(Continued)

OTHER PUBLICATIONS

Joo, Joshua, "Non-Final Office Action", U.S. Appl. No. 17/949,118, filed Sep. 20, 2022; Mailed Aug. 2, 2023.

(Continued)

*Primary Examiner* — Rinna Yi
(74) *Attorney, Agent, or Firm* — Philip H. Burrus, IV

(57) ABSTRACT

A method in an electronic device includes detecting, with one or more processors, a communication device electronically in communication with both a content presentation companion device operating as a primary display for the electronic device and a wearable companion device while an application operating on the one or more processors presents content on the content presentation companion device, one or more sensors of the electronic device determine an accessibility context of the electronic device meets at least a first predefined criterion and a proximity context of the electronic device meets at least a second predefined criterion. In response, the one or more processors redirect one or more user interface controls from a user interface of the electronic device to a user interface of the wearable companion device.

20 Claims, 8 Drawing Sheets

(56) References Cited

U.S. PATENT DOCUMENTS

| | | | |
|---|---|---|---|
| 2018/0078183 A1* | 3/2018 | Lor | G06F 3/011 |
| 2018/0164589 A1* | 6/2018 | Watanabe | G02B 27/0101 |
| 2018/0246640 A1* | 8/2018 | Khajuria | G06F 3/0482 |
| 2018/0335939 A1 | 11/2018 | Karunamuni | |
| 2019/0289192 A1 | 9/2019 | Lei | |
| 2019/0339855 A1 | 11/2019 | Walkin | |
| 2020/0042274 A1 | 2/2020 | Park | |
| 2022/0131822 A1 | 4/2022 | Jon | |
| 2022/0337780 A1 | 10/2022 | Huang | |
| 2022/0358000 A1 | 11/2022 | Lamb | |
| 2022/0391161 A1* | 12/2022 | Fan | G06F 3/1454 |
| 2023/0019250 A1 | 1/2023 | Lee | |
| 2023/0052490 A1 | 2/2023 | Chaudhri | |
| 2023/0057544 A1 | 2/2023 | Seigneurbieux | |
| 2023/0099404 A1 | 3/2023 | Karri | |
| 2024/0111473 A1 | 4/2024 | Wang | |
| 2024/0310877 A1 | 9/2024 | Kumar Agrawal | |
| 2024/0397161 A1 | 11/2024 | Kim | |
| 2025/0006091 A1 | 1/2025 | Zhu | |

OTHER PUBLICATIONS

"No Film Crew Needed", Motorola YouTube Video; Published Mar. 25, 2021; https://www.youtube.com/watch?v=1SQ9yH e-TGo.

"Reincubate Camo—User your phone as a pro webcam", How To; published online at https://reincubate.com/camo/ ; Unknown exact publication date but believed to be prior to filing of present application.

Hollister, Sean , "Apple explains how it's making your iPhone a full-fledged webcam for your Mac", Article on TheVerge.com; published online Jun. 7, 2022 at https://www.theverge.com/2022/6/7/23158510/apple-continuity-cam-work-any-app-zoom-desk-mode-api.

Motorola, , "New Ready For platform unleashes the power of moto g100", Published online Mar. 25, 2021 at https://us.motorola.com/blog/ready-for-g100.

Haughton, Anthony M. , "Notice of Allowance", U.S. 17/949,120, filed Sep. 20, 2022; Mailed Feb. 3, 2025.

Joo, Joshua , "Notice of Allowance", U.S. Appl. No. 17/949,118, filed Sep. 20, 2022; Mailed Nov. 15, 2023.

Fibbi, Christopher J. , "Non-Final Office Action", U.S. Appl. No. 17/949,116, filed Sep. 20, 2022; Mailed Feb. 27, 2025.

* cited by examiner

ELECTRONIC DEVICES AND CORRESPONDING METHODS FOR REDIRECTING USER INTERFACE CONTROLS DURING ACCESSIBILITY CONTEXTS

BACKGROUND

Technical Field

This disclosure relates generally to electronic devices, and more particularly to electronic devices with wireless communication capabilities.

Background Art

Many modern electronic communication devices, examples of which include smartphones, tablet computers, and laptop computers, are not only capable of enabling voice or video communications between people. To the contrary, their advanced processing power allows them to engage in videoconferences, stream content such as movies, videos, and television shows, play music, and offer other forms of entertainment. In addition to being tools for communicating with friends, family, and work colleagues, they are also real-time multimedia content entertainment devices.

Some electronic devices are equipped with a content redirection feature that allows this multimedia content to stream through a first device, such as a smartphone, and then to be redirected to a second device having a larger display. While this makes movies and television shows easier to see, it can cause problems with user interface control access. It would be advantageous to have improved electronic devices, methods, and systems that reduce or eliminate this issue.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
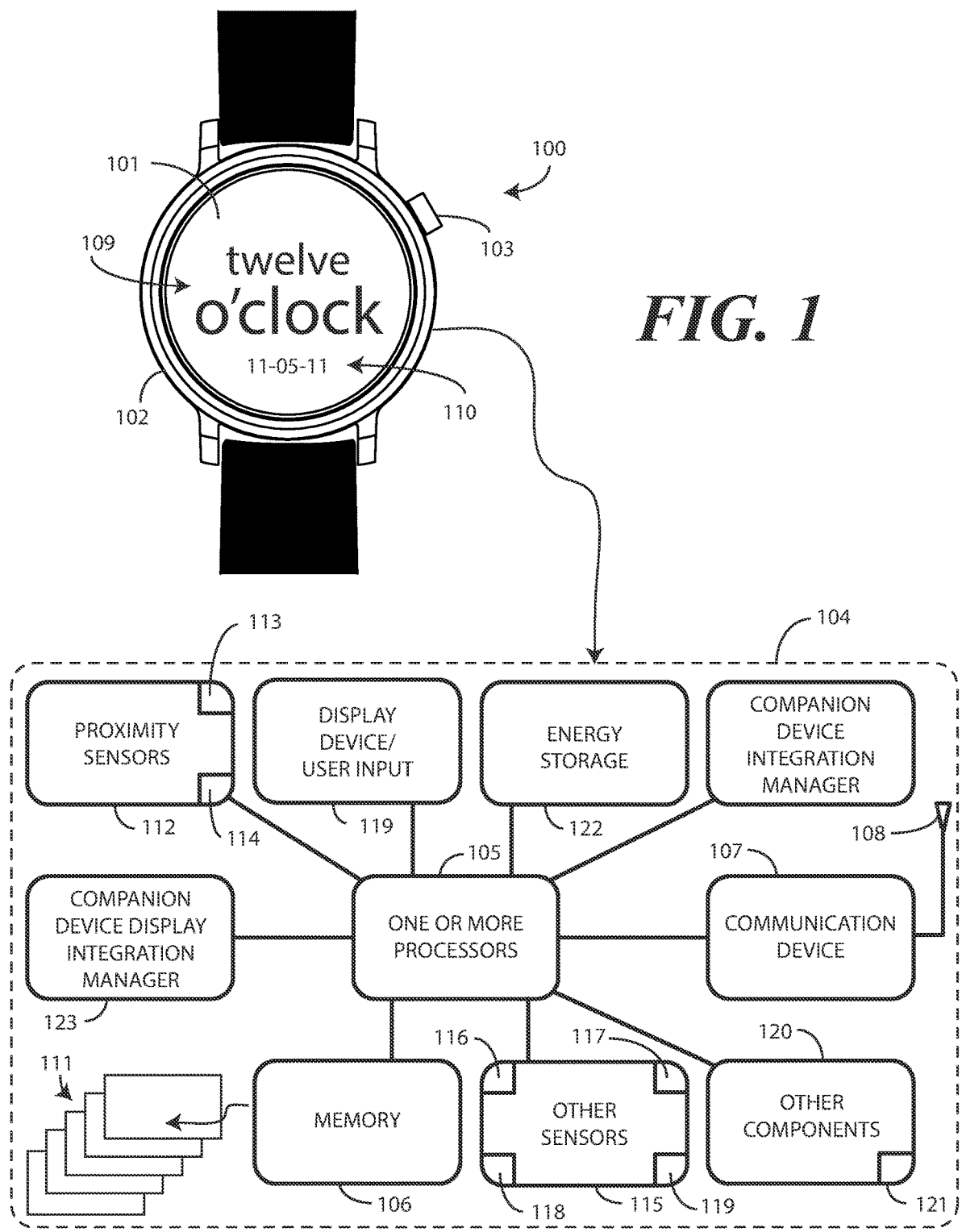
FIG. 1 illustrates one explanatory companion electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to redirecting one or more user interface controls from a user interface of an electronic device to a user interface of a wearable companion device when an accessibility context of the electronic device meets at least a first predefined criterion and a proximity context of the electronic device meets at least a second predefined criterion. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of dynamically redirecting one or more user interface controls operable at a display of an electronic device to a user interface of a wearable electronic device when at least a first predefined criterion of an accessibility context and a second predefined criterion of a proximity context are both met, as determined by one or more sensors of the electronic device. The non-processor circuits may include, but are not limited to, a display, a radio receiver, a radio transmitter, signal drivers, clock circuits, power source circuits, and user input devices. As such, these functions may be interpreted as steps of a method to perform the redirection of one or more user interface controls from an electronic device to the user interface of a smartwatch when, for example, an application is operating on the electronic device and presenting content on a content presentation companion device operating as a primary display for the electronic device while the electronic device is electronically in communication with the smartwatch and a condition where the electronic device is either connected to the content presentation companion device by a wire or is in a docked configuration while the hands of a user of the electronic device are occupied.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a companion electronic device that is operable with a primary electronic device. In one or more embodiments, the companion electronic device comprises a wearable electronic device, examples of which include a watch, bracelet, necklace, pendant, or other type of wearable electronic device.

In one or more embodiments, in addition to being operable with the companion electronic device, the electronic device is also operable with a content presentation companion device. In one or more embodiments, one or more processors of the electronic device can redirect content to the content presentation companion device so that the content presentation companion device can serve as a primary display for the electronic device. Illustrating by example, if the content presentation companion device comprises a television monitor and the electronic device comprises a smartphone, in one or more embodiments one or more processors of the smartphone can redirect a streamed movie, video, videoconference, or television show to the television monitor so that a user can enjoy this content on a wider screen.

Embodiments of the disclosure contemplate that users may enjoy this content redirection capability when attempting to perform tasks illustrated by, for example, instructional videos. Consider the situation where a person wants to make a recipe that a famous chef is making in a cooking show. The person likely will find it much easier to watch the show on a large monitor at the kitchen counter than having to squint at a relatively smaller display of a smartphone. At the same time, embodiments of the disclosure contemplate that in such situations the user's hands may be dirty or occupied, such as if the person is working with meat, kneading dough, or cutting vegetables or fruits. This creates a problem because if the person wants to temporarily rewind the cooking show to see a missed step, they will soil their smartphone when trying to access the user interface controls at the display. Advantageously, embodiments of the disclosure provide a solution to this problem by redirecting the user interface controls normally operable on an electronic device to a companion electronic device when the electronic device is operating in a content redirection mode and one or more sensors of the electronic device determine that the person using the electronic device has dirty or occupied hands.

In one or more embodiments, one or more processors of an electronic device determine that the electronic device is connected in an environment where a content presentation companion device is serving as a primary display for the electronic device while the electronic device is also in communication with a wearable electronic device, one example of which is a smartwatch. The one or more processors also determine, optionally using one or more of an audio sensor, a location detector, an image capture device, and/or one or more proximity sensors, that the electronic device is docked or connected to the content presentation companion device by a wire (the "proximity context") and that the user's hands are occupied, e.g., cooking, cleaning, or repairing, or are dirty (the "accessibility context").

Embodiments of the disclosure contemplate that in such cases it is frequently the case that the user is watching the content presentation companion device or listening to audio content while trying to simultaneously perform a task. Accordingly, in such situations one or more processors of the electronic device redirect one or more user interface controls from a user interface of the electronic device to a user interface of the wearable electronic device when the accessibility context of the electronic device meets such a first predefined criterion, and the proximity context meets such a second predefined criterion. Moreover, to keep the user from soiling the wearable electronic device, in one or more embodiments the wearable electronic device allows gesture control by moving the wearable electronic device in three-dimensional space in accordance with a predefined gesture so that the person can control the user interface controls without touching the wearable electronic device.

In one or more embodiments, a method comprises detecting, with one or more processors of an electronic device, a communication device electronically in communication with both a content presentation companion device operating as a primary display for the electronic device and a wearable companion device. In one or more embodiments, this detection occurs while (1) an application operating on the one or more processors presents content on the content presentation companion device, (2) one or more sensors of the electronic device determine an accessibility context of the electronic device meets at least a first predefined criterion, and (3) the one or more sensors of the electronic device determine that a proximity context of the electronic device meets at least a second predefined criterion. An example of the first predefined criterion comprises the hands of the user being unclean or occupied. An example of the second predefined criterion comprises the electronic device being in a docked configuration or coupled to the content presentation companion device by a wire.

In one or more embodiments, when these conditions are detected, the one or more processors of the electronic device redirect one or more user interface controls from a user interface of the electronic device to a user interface of the wearable companion device while the accessibility context meets the first predefined criterion, and the proximity context meets the second predefined criterion. Thus, if the electronic device is docked and streaming to the content presentation companion device, and the user's hands are unclean or occupied, in one or more embodiments the one or more processors of the electronic device redirect the user interface controls controlling the content presentation on the content presentation companion device that would ordinarily be operable on the electronic device to the wearable electronic device. As noted above, in one or more embodiments the wearable electronic device can be controlled using gestures translating the wearable electronic device in three-dimensional space. Thus, if the user's hands are unclean, they can simply wave them in accordance with a predefined gesture to control the content presentation on the content presentation companion device by causing one or more control signals to be delivered from the wearable electronic device to the electronic device.

In one or more embodiments, an electronic device comprises at least one display and a communication device electronically communicating with both a content presentation companion device operating as a primary display for the electronic device and a wearable electronic device while an application operating on the electronic device is presenting content on the content presentation companion device. In one or more embodiments, the electronic device comprises a smartphone and the wearable electronic device comprises a smartwatch.

In one or more embodiments, the electronic device comprises one or more sensors determining that an accessibility context of the electronic device meets at least a first predefined criterion and that a proximity context of the electronic device meets at least a second predefined criterion. When this occurs, the one or more processors dynamically redirect one or more user interface controls operable at the at least one display of the electronic device to a user interface of the wearable electronic device while the first predefined criterion and the second cropped portion are met. Thus, a person using a smartphone to stream a cooking show to a local monitor while wearing a smartwatch can control the cooking show using the smartwatch and without needing to wash their hands, thereby making content control quick, easy, and convenient.

Turning now to FIG. 1, illustrated therein is one explanatory companion electronic device configured in accordance with one or more embodiments of the disclosure. In this illustrative example, the companion electronic device is a wearable electronic device and is shown as a smartwatch 100. However, the companion electronic device could take many other forms as well. In other embodiments, the companion electronic device is configured as a bracelet, a neckband, a pendant, or as a configurable wearable electronic device that can be switched between, for example, a pendant configuration and a watch configuration or other configuration.

This illustrative smartwatch 100 includes a display 101, which may optionally be touch-sensitive. In one embodiment where the display 101 is touch-sensitive, the display 101 can serve as a primary user interface of the smartwatch 100. Users can deliver user input to the display 101 of such an embodiment by delivering touch input from a finger, stylus, or other objects disposed proximately with the display.

The explanatory smartwatch 100 of FIG. 1 also includes a watch casing 102. In one or more embodiments, the watch casing 102 is manufactured from a rigid material such as a rigid thermoplastic material, aluminum, steel, or another metal. Still other constructs will be obvious to those of ordinary skill in the art having the benefit of this disclosure.

The watch casing 102 can be formed from a single housing member or from multiple housing members. For example, the watch casing can include a front housing member disposed about the periphery of the display 101 and a rear-housing member defining the backside of the smartwatch 100. In other embodiments, the watch casing 102 can simply be disposed about perimeter of a smartwatch module that is inserted into watch casing 102.

Features can be incorporated into the watch casing 102. Examples of such features include an optional speaker port, microphone port, or electrical connector to which a charger may be coupled. Alternatively, a user interface component, such as the control button 103 shown in FIG. 1, can be disposed along the watch casing 102.

A block diagram schematic 104 of the smartwatch 100 is also shown in FIG. 1. In one embodiment, the smartwatch 100 includes one or more processors 105. The one or more processors 105 can be a single processor in one or more embodiments. Alternatively, the one or more processors 105 can include an application processor and, optionally, one or more auxiliary processors. Moreover, one or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the smartwatch 100. Each of the application processor and the auxiliary processor(s) can be configured to process and execute executable software code to perform the various functions of the smartwatch 100. In one embodiment, the auxiliary processor will be configured to perform fewer functions, and thus consume less power from an energy storage device 122, than does the application processor. A storage device, such as memory 106, can optionally store the executable software code used by the one or more processors 105 during operation.

In this illustrative embodiment, the smartwatch 100 also includes a communication device 107 that can be configured for wired or wireless communication with one or more other devices or networks. The networks can include a wide area network, a local area network, and/or personal area network. In one or more embodiments, the communication device 107 utilizes wireless technology for communication in peer-to-peer or ad hoc communications such as HomeRF, Bluetooth, IEEE 802.11, or other forms of wireless communication such as infrared technology. The communication device 107 can include wireless communication circuitry, one of a receiver, a transmitter, or transceiver, and one or more antennas 108.

In one or more embodiments, the communication device 107 operates in conjunction with the one or more processors 105 to electronically communicate through a communication network. For example, in one embodiment, the communication device 107 can be configured to communicate through a traditional cellular network. Other examples of networks with which the communication circuit may communicate include proprietary networks and direct communication networks. In other embodiments, the communication device 107 can communicate with near field or local area networks, infrared communication circuits, magnetic field modulation circuits, and Wi-Fi circuits. In one or more embodiments, the communication device 107 can be configured to provide messaging functionality to deliver electronic messages to remote devices.

In one embodiment, the one or more processors 105 can be responsible for performing the primary functions of the smartwatch 100. For example, in one embodiment the one or more processors 105 comprise one or more circuits operable with one or more user interface devices, which can include the display 101, to present presentation information, such as the time of day 109 or date 110, to a user.

The executable software code used by the one or more processors 105 can be configured as one or more modules 111 that are operable with the one or more processors 105. Such modules 111 can store instructions, control algorithms, logic steps, and so forth. In one embodiment, the one or more processors 105 are responsible for running the operating system environment. The operating system environment can include a kernel and one or more drivers, and an application service layer, and an application layer. The operating system environment can be configured as executable code operating on one or more processors or control circuits of the smartwatch 100.

The application layer can be responsible for executing application service modules. The application service modules may support one or more functions or applications or "apps." Examples of such applications shown in FIG. 1 include a time-of-day application that presents the time of day 109 and/or date 110 on the display 101. Other explanatory applications or functions will be obvious to one of ordinary skill in the art having the benefit of this disclosure. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 112 can be operable with the one or more processors 105. In one embodiment, the one or more proximity sensors 112 include one or more proximity sensor components 113. The proximity sensors 112 can also include one or more proximity detector components 114. In one embodiment, the proximity sensor components 113 comprise only signal receivers. By contrast, the proximity detector components 114 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 113 comprises an infrared signal receiver so as to be able to detect infrared emissions from a person. Accordingly, the proximity sensor component 113 requires no transmitter since objects disposed external to the housing deliver emissions that are received by the infrared receiver. As no transmitter is required, each proximity sensor component 113 can operate at a very low power level.

In one embodiment, one or more proximity detector components 114 can each include a signal receiver and a corresponding signal transmitter. The signal transmitter can transmit a beam of infrared light that reflects from a nearby object and is received by a corresponding signal receiver. The proximity detector components 114 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the smartwatch 100.

One or more other sensors 115 included in the smartwatch 100 may include a microphone 116 (or multiple microphones), a speaker 117, and an image capture device 118. The microphone 116 can be included as an audio capture device. These audio capture devices can be operable with the one or more processors 105 to receive voice input. Additionally, in one or more embodiments the audio capture devices can capture ambient audio noise. Signals corresponding to captured audio can be transmitted to an electronic device in communication with the smartwatch 100 or a server or cloud-computing device. The other sensors 115 can additionally include loudspeakers such as speaker 117 for delivering audio content to a user wearing the smartwatch 100.

The one or more other sensors 115 may also include key selection sensors, a touch pad sensor, a touch screen sensor, a capacitive touch sensor, and one or more switches. Touch sensors 119 may be used to indicate whether any of the user actuation targets present on the display 101 are being actuated. Alternatively, touch sensors 119 disposed in the watch casing 102 can be used to determine whether the smartwatch 100 is being touched at side edges or major faces of the smartwatch 100. The touch sensors 119 can include surface and/or housing capacitive sensors in one embodiment.

The other sensors 115 can be optionally include a global positioning system device for determining where the smartwatch 100 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other components 120 of the smartwatch 100 can also include motion detectors 121. For example, an accelerometer may be embedded in the electronic circuitry of the smartwatch 100 to show vertical orientation, constant tilt and/or whether the smartwatch 100 is stationary. The measurement of tilt relative to gravity is referred to as "static acceleration," while the measurement of motion and/or vibration is referred to as "dynamic acceleration." A gyroscope can be used in a similar fashion.

Regardless of the type of motion detectors 121 that are used, in one embodiment the motion detectors 121 are also operable to detect movement, and direction of movement, of the smartwatch 100 by a user. In one or more embodiments, the other sensors 115 and the motion detectors 121 can each be used to detect motion corresponding to a user's body or to human motion. This information can be used to determine that the smartwatch 100 is being worn on a user's wrist, for example, as well as to detect gesture movement for gesture-based control operation.

Illustrating by example, in one embodiment when the smartwatch 100 is being worn on a wrist, the motion detectors 121 can be used to detect predefined motions corresponding to human motion. These predefined motions can be small, and can include vibration, shaking, breathing, micromotions, and so forth. For instance, if the user is walking, the motion detectors 121 can detect this movement by detecting motion of the user's wrist. This detection can be used to identify predefined gestures translating the smartwatch 100 in three-dimensional space in accordance with a predefined motion.

The one or more processors 105 can then extract parametric data from electronic signals delivered by these motion detectors 121 in response to the user walking. By comparing the parametric data to a reference file stored in memory 106, the one or more processors 105 can identify the walking motion as corresponding to the motion of the user's body. The one or more processors 105 can use this information to distinguish the smartwatch 100 being actively worn on a wrist, for example, as opposed to being placed along a flat surface such as a nightstand or dresser top. The motion detectors 121 can be used to detect other movement of the smartwatch 100 as well. For example, in some embodiments a user can deliver gesture input by moving a hand or arm in predefined motions when the smartwatch 100 is being worn on a wrist.

Many of the sensors in the smartwatch 100 can be used to detect movement, gestures, or other user input. For example, the one or more proximity sensors 112 can detect the gesture of a user waving a hand above the display 101. In another embodiment, an accelerometer of the motion detectors 121 can detect gesture input from a user lifting, shaking, or otherwise deliberately moving the smartwatch 100. In yet other embodiments, the user can deliver gesture input by rotating or changing the orientation of the smartwatch 100, which can be detected by multiple accelerometers or a gyroscope. Examples of this will be illustrated in more detail below with reference to FIG. 5. It should be clear to those of ordinary skill in the art having the benefit of this disclosure that additional sensors can be included with the other sensors 115 shown in FIG. 1.

Other components 120 operable with the one or more processors 105 can include output components such as video outputs, audio outputs, and/or mechanical outputs. Examples of output components include audio outputs, or other alarms and/or buzzers and/or a mechanical output component such as vibrating or motion-based mechanisms. Still other components will be obvious to those of ordinary skill in the art having the benefit of this disclosure.

The other components 120 can also include a motion generation device for providing haptic notifications or vibration notifications to a user. For example, a piezoelectric transducer, rotational motor, or other electromechanical device can be configured to impart a force or vibration upon the wrist of a wearer through the watch casing 102. The motion generation device can provide a thump, bump, vibration, or other physical sensation to the user. The one or more processors 105 can be configured to actuate the motion generation device to deliver a tactile or vibration output alone or in combination with other outputs such as audible outputs.

An energy storage device 122, such as a rechargeable battery, super capacitor, or fuel cell, can be included in the smartwatch 100 to power its various components. Where a rechargeable battery is used as the energy storage device 122, this battery can include a lithium-ion cell or a nickel metal hydride cell. In one embodiment, the battery is a lithium polymer cell, as such cells having reasonably large energy density, wide operating temperature range, offer large number of charging cycles, and provide long useful life. The energy storage device 122 may also include overvoltage and overcurrent protection and charging circuitry. In one embodiment, the energy storage device 122 is a 350 milli-Amp-hour lithium polymer cell.

In one or more embodiments, the smartwatch 100 includes a companion device display integration manager 123. When another device transmits user interface controls, signals, or other information to the smartwatch 100, the companion device display integration manager 123 delivers that information to the one or more processors 105 for presentation to the user. Illustrating by example, when user interface controls are redirected from an electronic device to the smartwatch 100, the one or more processors 105 can present those user interface controls on the display 101. This will be illustrated in more detail below with reference to FIG. 4.

It is to be understood that FIG. 1 is provided for illustrative purposes only and for illustrating components of one smartwatch 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
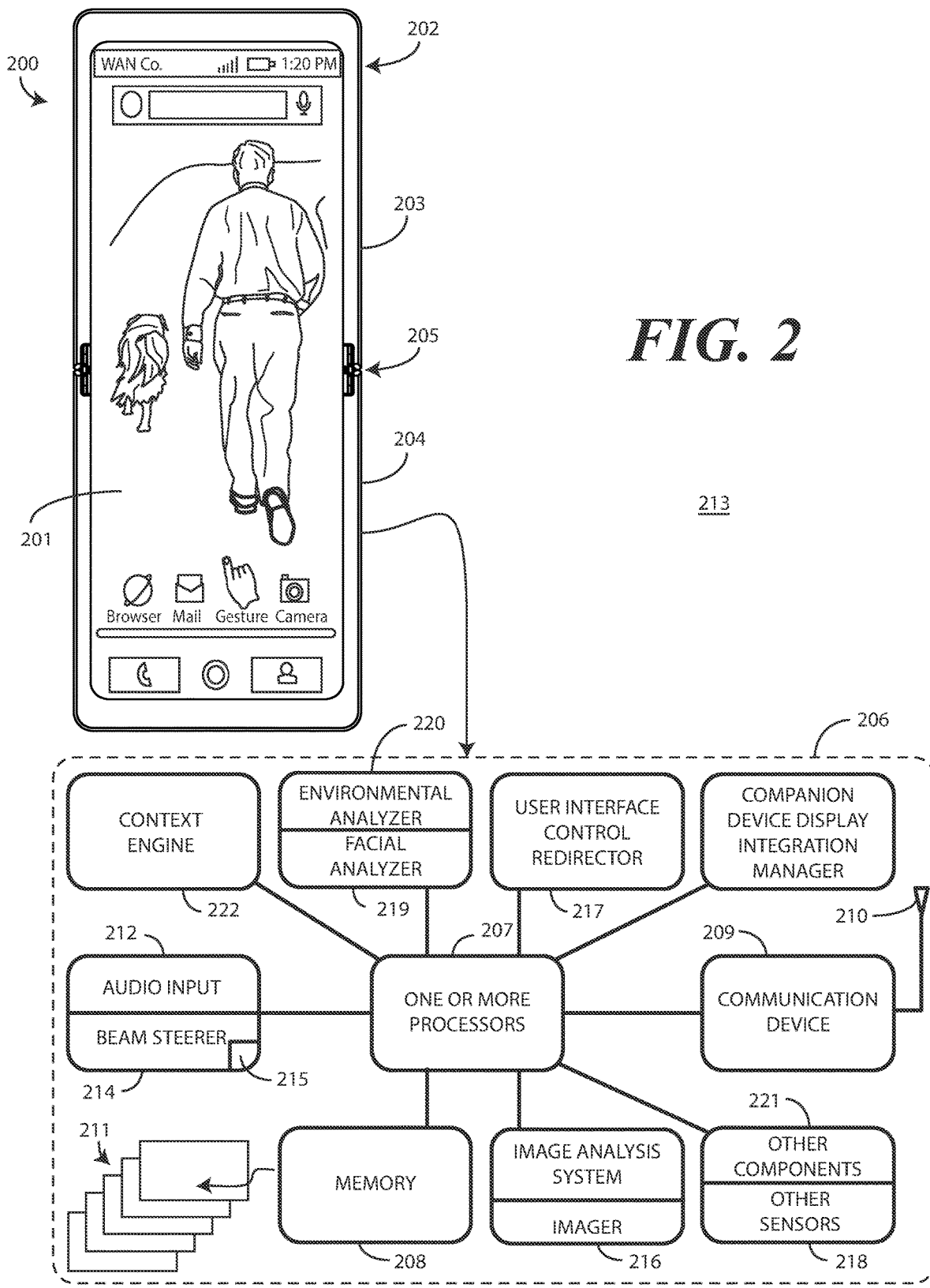
FIG. 2 illustrates one explanatory electronic device in accordance with one or more embodiments of the disclosure.

The smartwatch 100 of FIG. 1 can operate as a stand-alone electronic device in one or more embodiments. However, in other embodiments, the smartwatch 100 can operate in tandem with another electronic device, via wireless electronic communication using the communication device 107 or via a wired connection channel. Turning now to FIG. 2, illustrated therein is one such electronic device 200.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position.

In other embodiments, the device housing 202 will be rigid and will include no hinge. In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by electrical conductors or a bus disposed along one or more printed circuit boards.

The illustrative block diagram schematic 206 of FIG. 2 includes many different components. Embodiments of the disclosure contemplate that the number and arrangement of such components can change depending on the particular use case or application. Examples of such applications relevant to the methods described below include content consumption applications, examples of which include video streaming applications, movie streaming applications, image viewing applications, and television show streaming applications, and user interaction applications, examples of which include video games, productivity applications such as word processors and spreadsheets, and content creation applications. Accordingly, electronic devices configured in accordance with embodiments of the disclosure can include some components that are not shown in FIG. 2, and other components that are shown may not be needed and can therefore be omitted.

In one embodiment, the electronic device 200 includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an audio input/processor 212. The audio input/processor 212 is operable to receive audio input from an environment 213 about the electronic device 200. The audio input/processor 212 can include hardware, executable code, and speech monitor executable code in one embodiment. The audio input/processor 212 can be operable with one or more predefined identification references stored in memory 208. With reference to audio input, the predefined identification references can comprise representations of basic speech models, representations of trained speech models, or other representations of predefined audio sequences that are used by the audio input/processor 212 to receive and identify voice commands that are received with audio input captured by an audio capture device. In one embodiment, the audio input/processor 212 can include a voice recognition engine. Regardless of the specific implementation utilized in the various embodiments, the audio input/processor 212 can access various speech models stored with the predefined identification references to identify speech commands, languages being spoken, and other information.

The audio input/processor 212 can include a beam steering engine 214 comprising one or more microphones 215. Input from the one or more microphones 215 can be processed in the beam steering engine 214 such that the one or more microphones define a virtual microphone. This virtual microphone can define an acoustic reception cone that can be virtually "steered" around the electronic device 200. Alternatively, actual steering can occur as well, such as switching between a left and right microphone or a front and back microphone or switching various microphones ON and OFF individually. In one or more embodiments, two or more microphones 215 can be included for selective beam steering by the beam steering engine 214.

Illustrating by example, a first microphone can be located on a first side of the electronic device 200 for receiving audio input from a first direction, while a second microphone can be placed on a second side of the electronic device 200 for receiving audio input from a second direction. These microphones can be "steered" by selectively turning them ON and OFF. The beam steering engine 214 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an image capture device 216 can estimate a location of a person's face and deliver signals to the beam steering engine 214 alerting it in which direction to focus the acoustic reception cone and/or steer the first microphone and the second microphone, thereby adding confirmation to audio steering and saving time. Where multiple people are around the electronic device 200, this steering advantageously directs a beam reception cone toward a particular person so that languages spoken, language preferences, and other information about the person's speech can be ascertained.

Alternatively, the beam steering engine 214 processes and combines the signals from two or more microphones to perform beam steering. The one or more microphones 215 can be used for voice commands and/or for language recognition. In response to control of the one or more microphones 215 by the beam steering engine 214, a user location direction can be determined. The beam steering engine 214 can then select between the first microphone and the second microphone to beam steer audio reception toward the user. Alternatively, the audio input/processor 212 can employ a weighted combination of the microphones to beam steer audio reception toward the user.

The one or more processors 207 can perform filtering operations on audio input received by the audio input/processor 212. For example, in one embodiment the one or more processors 207 can filter the audio input into identifiable audio input, i.e., first audio input, and other audio input that is not identifiable, i.e., second audio input.

Various sensors 218 can be operable with the one or more processors 207. One example of a sensor that can be included with the various sensors 218 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 218 is a geo-locator that serves as a location detector. In one embodiment, location detector is able to determine location data when authenticating a user. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, or from other local area networks, such as Wi-Fi networks.

Another example of a sensor that can be included with the various sensors 218 is an orientation detector operable to determine an orientation and/or movement of the electronic device 200 in three-dimensional space. Illustrating by example, the orientation detector can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 200 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 200.

In one or more embodiments, the electronic device 200 includes an image capture device 216. In one embodiment, the image capture device 216 comprises a two-dimensional imager configured to receive at least one image of a person within an environment of the electronic device 200. In one embodiment, the image capture device 216 comprises a two-dimensional red-green-blue (RGB) imager. In another embodiment, the image capture device 216 comprises an infrared imager. Other types of imagers suitable for use as the image capture device 216 will be obvious to those of ordinary skill in the art having the benefit of this disclosure.

The electronic device 200 can include a face analyzer 219 and an environmental analyzer 220. The face analyzer 219 and/or environmental analyzer 220 can be configured to process an image or depth scan of an object and determine whether the object matches predetermined criteria by comparing the image or depth scan to one or more predefined identification references stored in memory 208.

For example, the face analyzer 219 and/or environmental analyzer 220 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 220 can be used as a facial recognition device to determine the identity of one or more persons detected within the environment 213 of the electronic device 200.

The face analyzer 219 can include an image/gaze detection-processing engine as well. The image/gaze detection-processing engine can process information to detect a user's gaze point. Electronic signals can then be delivered from the image capture device 216 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 221 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 221 can also include proximity sensors. The proximity sensors fall in to one of two camps: active proximity sensors and "passive" proximity sensors. Either the proximity detector components or the proximity sensor components can be generally used for gesture control and other user interface protocols.

The other components 221 can optionally include a barometer operable to sense changes in air pressure due to elevation changes or differing pressures of the electronic device 200. The other components 221 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 222 can then be operable with the various sensors to detect, infer, capture, and otherwise determine persons and actions that are occurring in an environment about the electronic device 200. For example, where included one embodiment of the context engine 222 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 222 in detecting multi-modal social cues, emotional states, moods, and other contextual information. The context engine 222 can comprise an artificial neural network or other similar technology in one or more embodiments.

In one or more embodiments, the context engine 222 is operable with the one or more processors 207. In some embodiments, the one or more processors 207 can control the context engine 222. In other embodiments, the context engine 222 can operate independently, delivering information gleaned from detecting multi-modal social cues, emotional states, moods, and other contextual information to the one or more processors 207. The context engine 222 can receive data from the various sensors. In one or more embodiments, the one or more processors 207 are configured to perform the operations of the context engine 222.

In one or more embodiments, the electronic device 200 includes a user interface controls redirector 217. Working with the other components, the user interface controls redirector 217 can dynamically redirect one or more content consumption application user interface controls operable at a user interface of the electronic device 200, one example of which is the display 201, to a user interface of a wearable electronic device, one example of which is the smartwatch (100) of FIG. 1 under certain conditions.

In one or more embodiments, these conditions require that the electronic device 200 be electronically in communication with the wearable electronic device and also electronically in communication with a content presentation companion device, one example of which will be described below with reference to FIG. 3. In one or more embodiments, these conditions also require that the content presentation companion device is operating as a primary display for a first application operating on the one or more processors 207 of the electronic device 200 and that the electronic device 200 is in a docked configuration or is communicating with the content presentation companion device via a wire while a user's hands, as determined by the one or more sensors 218, are unclean or occupied.

In one or more embodiments, when these conditions occur, the one or more processors 207 in response redirect the one or more user interface controls associated with the first application from the on-board display of the electronic device to a user interface of the wearable companion device defined by the smartwatch (100). In one or more embodiments, this redirection continues while these conditions are met.

Figure 3:
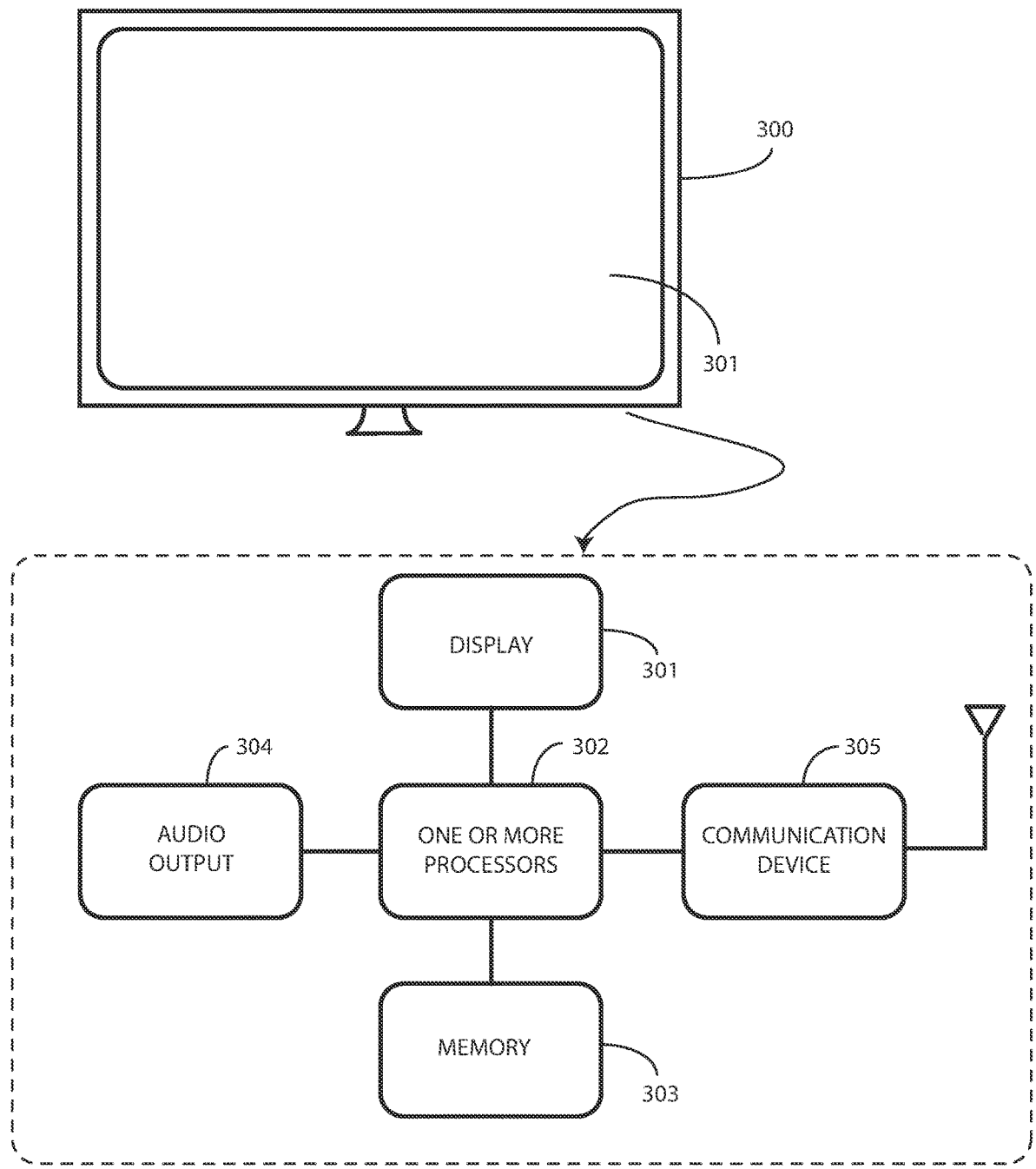
FIG. 3 illustrates one explanatory content presentation companion device in accordance with one or more embodiments of the disclosure.

Turning now to FIG. 3, illustrated therein is one explanatory content presentation companion device 300 in accordance with one or more embodiments of the disclosure. In this illustrative embodiment, the content presentation companion device 300 comprises a color video monitor. In other embodiments, the content presentation companion device 300 can take other forms. Illustrating by example, the content presentation companion device 300 can be a television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the content presentation companion device 300 includes one or more processors 302, a display 301, a memory 303, an audio output 304, and a communication device 305 capable of wired or wireless communication with an electronic device such as the electronic device (200) of FIG. 2.

In one or more embodiments, when coupled by either a wireless or wired connection to such an electronic device (200), the content presentation companion device 300 can function as a primary display for the electronic device (200). The electronic device (200) can receive content from a terrestrial broadcast network, cable television network, Internet streaming service, or combinations thereof, and redirect this content to the content presentation companion device 300 since its display 301 is larger than the display (201) of the electronic device (200). This allows people within the environment of the electronic device (200) or content presentation companion device 300 to more easily see the content. In one or more embodiments, content flows from the electronic device (200) to the content presentation companion device 300 through the communication device 305.

Figure 4:
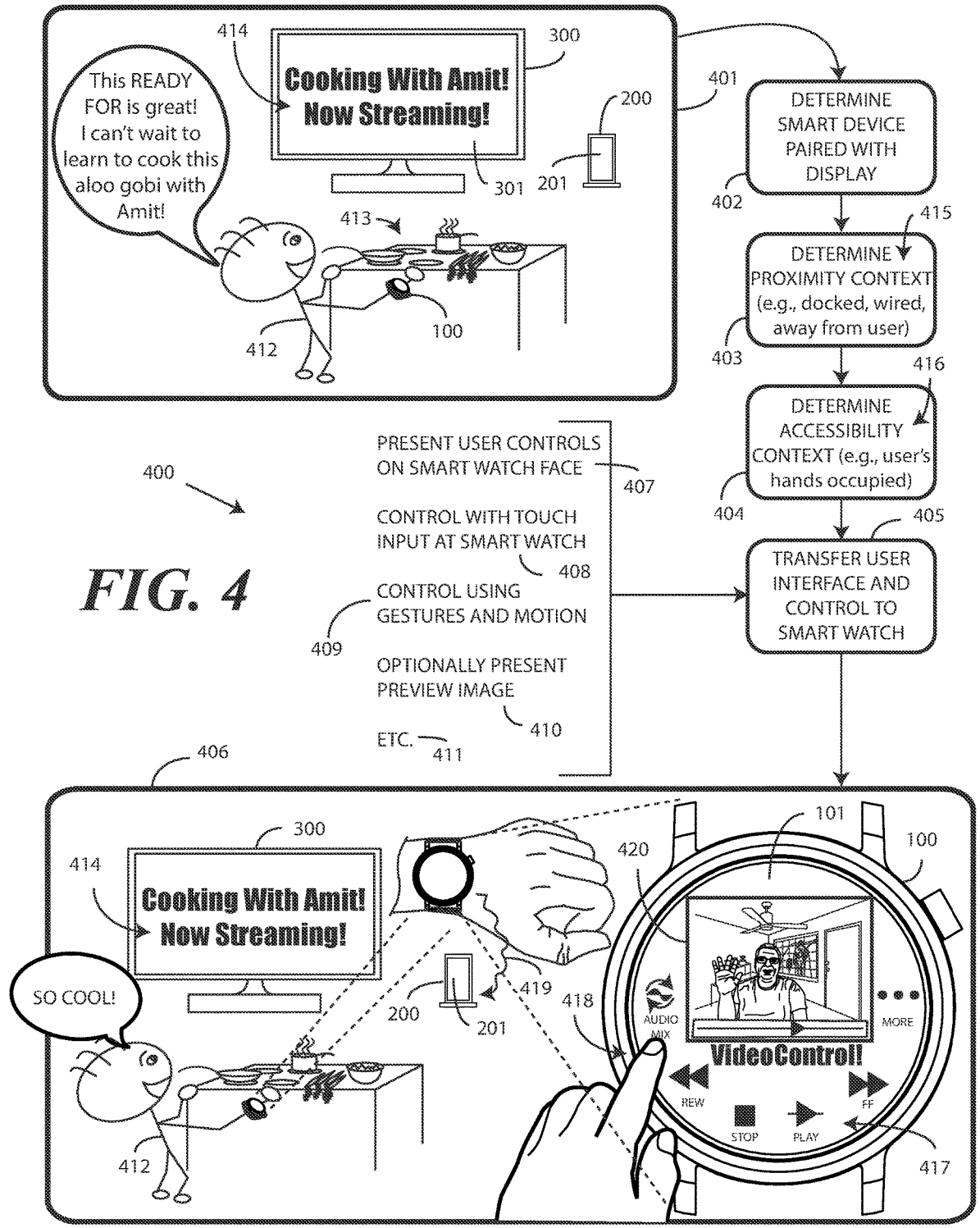
FIG. 4 illustrates one explanatory method in accordance with one or more embodiments of the disclosure.

Turning now to FIG. 4, illustrated therein is one explanatory method 400 illustrating how the smartwatch 100 of FIG. 1, the electronic device 200 of FIG. 2, and the content presentation companion device 300 can be used as a system to redirect user interface controls from the electronic device 200 to the smartwatch 100 when an application operating on one or more processors (207) of the electronic device 200 presents content on the content presentation companion device 300 while one or more sensors (218) of the electronic device determine that an accessibility context of the electronic device 200 meets at least a first predefined criterion and a proximity context of the electronic device 200 meets at least a second predefined criterion. In one or more embodiments, when this occurs the one or more processors (207) redirect one or more user interface controls from a user interface of the electronic device to a user interface of the wearable electronic device defined by the smartwatch 100 so that a user can control the user interface controls while their hands are occupied, unclean, or otherwise not well suited for navigating the user interface controls on the electronic device 200 itself.

Beginning at step 401, a person 410 is using an electronic device 200 in electronic communication with a content presentation companion device 300 operating as a primary display for the electronic device 200. In this example, the person 410 is using the electronic device 200 to stream a cooking show called "Cooking with Amit!" Rather than trying to watch content 414 in the form of the cooking show on the display 201 of the electronic device 200, the person 410 is operating the electronic device 200 in a "ready for" context that uses the display 301 of the content presentation companion device 300 as the primary display for the electronic device 200. Consequently, even though the electronic device 200 is streaming the cooking show, the person 410 can watch Amit prepare his ever so delicious meals on the big screen provided by the display 301 of the content presentation companion device 300.

As shown at step 401, the person 410 is also wearing a smartwatch 100 that is in electronic communication with the electronic device 200. Accordingly, at step 402 one or more processors (207) of the electronic device can detect a communication device (209) of the electronic device being electronically in communication with both the content presentation companion device 300 while the content presentation companion device 300 operates as a primary display for the electronic device 200 and a wearable companion device defined by the smartwatch 100.

In this illustrative example, the one or more processors (207) of the electronic device detect this communication at step 402 while an application is operating on the one or more processors (207) to present content on the content presentation companion device 300. At step 401, the application is a content streaming application and the content being presented on the content presentation companion device 300 is Cooking with Amit!

At step 403, the one or more sensors (218) of the electronic device determine a proximity context 415 of the electronic device 200 meets at least a first predefined criterion. As used herein, "proximity context" 415 refers to a physical condition of the electronic device 200 itself. Illustrating by example, at step 401 the electronic device 200 is in a docked operating condition due to the fact that the electronic device 200 is seated in a docking station. Another example of a first predefined criterion would be when the electronic device 200 is connected to the content presentation companion device 300 by a wired connection. Still other proximity contexts will be obvious to those of ordinary skill in the art having the benefit of this disclosure.

At step 403, one or more sensors (218) of the electronic device 200 determine that an accessibility context 416 of the electronic device 200 meets at least a second predefined criterion. As used herein "accessibility context" 416 means that there is an issue impeding the person 410 from readily accessing the user interface of the electronic device 200. Illustrating by example, in one or more embodiments the second predefined criterion comprises the hands of the person 410 being occupied. Such is the case in step 401 because the person 410 is cooking 413 along with Amit while watching the cooking show.

Another example of the second predefined criterion is the hands of the person 410 being unclean. This could also be the case at step 401 since the hands of the person are preparing Amit's delicious aloo gobi with two pans already working on the stove, mis-en-place prepared, and other vegetables waiting to be prepared. Other examples of accessibility contexts 416 will be obvious to those of ordinary skill in the art having the benefit of this disclosure.

In one or more embodiments, steps 402, 403, 404 occur at the same time. Said differently, in one or more embodiments the one or more processors (207) of the electronic device 200 detect a communication device (209) of the electronic device 200 electronically in communication with both the content presentation companion device 300 operating as a primary display for the electronic device and the wearable companion device defined by the smartwatch 100 while (1) the application operating on the one or more processors (207) presents content 414 on the content presentation companion device 300, (2) one or more sensors (218) of the electronic device determine the accessibility context 416 of the electronic device 200 meets at least a first predefined criterion, and (3) the one or more sensors (218) determine a proximity context 415 meets at least a second predefined criterion.

In one or more embodiments, when this occurs the one or more processors (207) of the electronic device 200 in response, at step 405, redirect one or more user interface controls 417 from a user interface of the electronic device 200 to a user interface of the wearable companion device defined by the smartwatch 100 while the accessibility context 416 meets the first predefined criterion and the proximity context 415 meets the second predefined criterion. This transfer, shown after occurring at step 405, can occur in a variety of ways.

In one or more embodiments, the transfer of the user interface controls 417 to the smartwatch 100 causes the user interface controls 417 to be presented 407 as a plurality of user actuation targets on the display 101 of the smartwatch 100 as shown at step 406. Person 412 can then interact with these user actuation targets to control the content 414 being presented on the content presentation companion device 300 without the need to access the user interface defined by the display 201 of the electronic device 200. Thus, the user interactions 418 controlling the content 414 can be made locally at the smartwatch 100 without the need of the person 412 leaving the cooking station to walk across the room to use the display 201 of the electronic device 200.

In one or more embodiments, when the user interface controls 417 are transferred to the smartwatch 100, they are contextually presented on the display 101 of the smartwatch 100 for only a predefined duration when a particular use case is occurring so as not to overly tax the energy storage device of the smartwatch 100. This means that the user interface controls 417 are presented for user interaction only while the one or more processors (207) of the electronic device 200 detect a communication device (209) of the electronic device 200 electronically in communication with both the content presentation companion device 300 operating as a primary display for the electronic device and the wearable companion device defined by the smartwatch 100 while (1) the application operating on the one or more processors (207) presents content 414 on the content presentation companion device 300, (2) one or more sensors (218) of the electronic device determine the accessibility context 416 of the electronic device 200 meets at least a first predefined criterion, and (3) the one or more sensors (218) determine a proximity context 415 meets at least a second predefined criterion to conserve power. If, for example, the one or more processors (207) were monitoring for user input interacting with the user interface controls 417 continually—be it gesture input, touch input, or other input—the energy storage device of the smartwatch 100 would be depleted rather quickly. Accordingly, the contextual redirection of the user interface controls 417 under certain conditions helps to conserve energy in the energy storage device of the smartwatch 100 by surfacing the user interface controls 417 for user interaction pragmatically.

When person 412 interacts 418 with these user actuation targets by touching the display 101 of the smartwatch 100 at the locations where the user actuation targets are located, application control signals controlling 408 the application operating on the one or more processors (207) and streaming the content 414 are then transmitted to the electronic device 200 to control the content 414 being presented on the content presentation companion device 300. Alternatively, as will be described below with reference to FIG. 5, in other embodiments gestures translating the smartwatch 100 in three-dimensional space can be used to cause control signals to be transmitted from the smartwatch 100 to the electronic device 200 to control 409 the content 414 being presented on the content presentation companion device 300. Other operations 411 can occur as well.

Accordingly, at step 405 the one or more processors (207) of the electronic device 200 redirect one or more user interface controls 417, shown at step 406, of the application operating on the one or more processors (207) of the electronic device and streaming the content 414 to the content presentation companion device 300 that would, ordinarily, be presented on the on-board display of the electronic device 200 to a user interface of the wearable companion device defined by the smartwatch 100. In one or more embodiments, the transfer of the user interface controls 417 to the smartwatch 100 causes the user interface controls 417 to be presented as a plurality of user actuation targets on the display 101 of the smartwatch 100 as shown at step 406. The person 412 can then interact with these user actuation targets to control the cooking show or other content being presented on the content presentation companion device 300 by the application without the need to access the user interface defined by the display 201 of the electronic device 200. When the person 410 interacts 418 with these user actuation targets by touching the display 101 of the smartwatch 100 at the locations where the user actuation targets are located, one or more control signals 419 for the application are then transmitted to the electronic device 200 to control the application and, therefore, the content 414 being presented on the content presentation companion device 300.

In one or more embodiments, a preview image 420 generated by the first application that identifies the first application is also presented on the display 101 of the smartwatch 100. In this illustrative embodiment, the preview image 420 comprises a mirroring of the content, which shows Amit cooking in his kitchen in this example, with a play status indicator and a moniker identifying that the cooking show is now being controlled by the user interface of the smartwatch 100. Other examples of preview images 420 generated by a content consumption application will be obvious to those of ordinary skill in the art having the benefit of this disclosure.

In this explanatory embodiment, the one or more user interface controls 417 shown at step 406 are content streaming controls. In addition to these content streaming controls being presented on the display 101 of the smartwatch 100 as interactive user actuation targets, the preview image 420 of Amit waving while cooking his world-famous aloo gobi is also presented on the display 101 of the smartwatch 100. In this example, the user interface controls 417 have been rearranged from their format on the display 201 of electronic device 200, which is rectangular, to more appropriately fit the display 101 of the smartwatch 100, which is round.

In this illustrative example, the user interface controls 417 allow the person 412 to manipulate the one or more images of the cooking show by actuating various user icons configured as user actuation targets. In this example, the user interface controls 417 allow the person 410 to fast forward the content 414 being presented on the content presentation companion device 300, stop the content 414 being presented on the content presentation companion device 300, start the content 414 being presented on the content presentation companion device 300, rewind the content 414 being presented on the content presentation companion device 300, and adjust the audio mix, in addition to offering an additional options user actuation target.

Once the person 412 interacts 418 with the user interface controls 417 that have been redirected to the smartwatch 100, in one or more embodiments the communication device (107) of the smartwatch 100 sends application control 419 signals to the electronic device 200 to control the application streaming the content 414 being presented on the content presentation companion device 300. Accordingly, in one or more embodiments step 406 also comprises the electronic device 200 receiving, after the redirecting, one or more application control signals 419 from the wearable companion device defined by the smartwatch 100. Step 406 can also comprise controlling 408 one or more control parameters of the application streaming the content 414 being presented on the content presentation companion device 300 as a function of the one or more application control signals 419. In the illustrative embodiment of FIG. 4, the one or more application control signals are initiated by the actuation of at least one user interface controls at the user interface of the smartwatch 100 defined by the display 101 when the person 412 touches a particular user actuation target with their finger.

In one or more embodiments, this redirection occurring at step 406 continues to occur so long as (1) the application continues to stream the content 414 being presented on the content presentation companion device 300 while the electronic device 200 is electronically in communication with the content presentation companion device 300 operating as a primary display for the electronic device 200 and the wearable companion device defined by the smartwatch 100, (2) the accessibility context 416 meets the second predefined criterion, and (3) the proximity context 415 meets the first predefined criterion. Thus, as long as, for example, the electronic device 200 remains docked and the person's hands remain occupied, as these are examples of each criterion, the one or more processors (207) of the electronic device will continue to redirect the user interface controls to the smartwatch 100.

As shown at step 406, since the first application is a video streaming application streaming the content 414 being presented on the content presentation companion device 300 in this example, the one or more user interface controls redirected to the smartwatch 100 include one or more of a stop user actuation target, a play user actuation target, an audio control user actuation target, a rewind user actuation target, and/or a fast forward user actuation target.

As shown at step 406, the person 412 is delivering touch input to the display 101 of the smartwatch 100 at one of the user interface controls user actuation targets. In one or more embodiments, this causes one or more control signals 419 to be delivered from the smartwatch 100 to the electronic device 200. In one or more embodiments, the one or more processors (207) of the electronic device 200 then control one or more control parameters of a presentation presented on the content presentation companion device 300 by the application as a function of the one or more control signals 419.

If, for example, the person 412 touches the rewind user actuation target, the one or more processors (105) of the smartwatch 100 would cause the communication device (107) of the smartwatch 100 to transmit the one or more control signals 419 to the electronic device 200. The one or more processors (207) of the electronic device 200 would then cause the content 414 being presented on the content presentation companion device 300 to rewind, and so forth. Accordingly, at step 406 the one or more control signals 419 are initiated by actuation of at least one user interface control of the one or more user interface controls at the user interface of the wearable companion device defined by the smartwatch 100.

Figure 5:
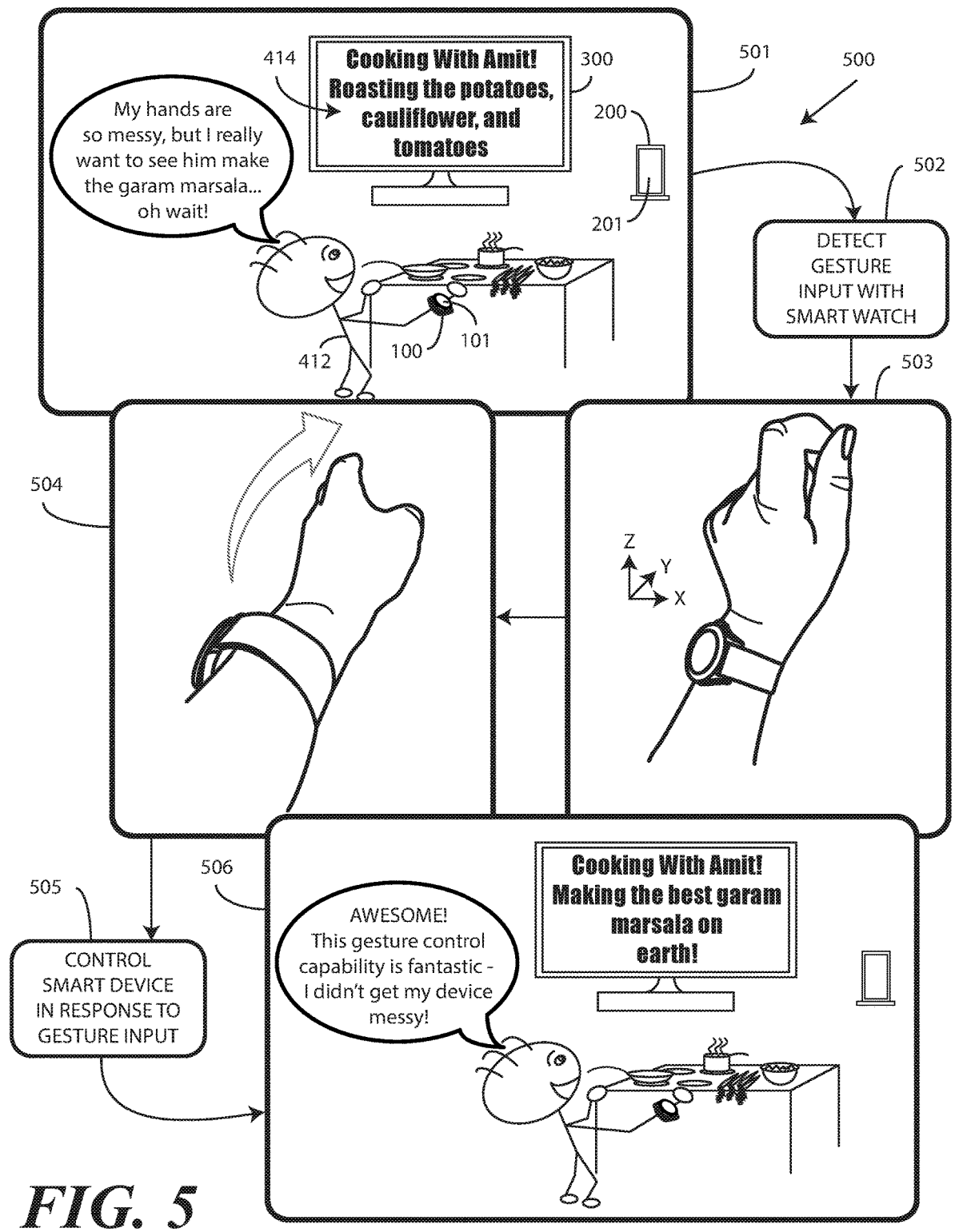
FIG. 5 illustrates one explanatory method in accordance with one or more embodiments of the disclosure.

In other embodiments, gestures can be used to control the one or more control parameters of the presentation presented on the content presentation companion device 300 as well. Turning now to FIG. 5, the person 412 controls the content 414 being presented on the content presentation companion device 300 using a gesture.

At step 501, the one or more processors (207) of the electronic device 200 are causing the content 414 being presented on the content presentation companion device 300 to be redirected to the content presentation companion device 300, which is functioning as a primary display for the video streaming application operating on the one or more processors (207) of the electronic device 200 and streaming the content 414 being presented on the content presentation companion device 300. As such, the communication device (209) of the electronic device 200 is electronically in communication with both the content presentation companion device 300 and the wearable electronic device that is the smartwatch 100. The content 414 being presented on the content presentation companion device 300 is being delivered to the content presentation companion device 300 for presentation to the environment around the electronic device 200.

Since the one or more sensors (218) of the electronic device 20 determine that the accessibility context (416) meets at least a first predefined criterion due to the fact that the hands of the person 412 are both occupied and unclean, and since the one or more sensors (218) determine that the proximity context (415) meets at least a second predefined criterion due to the fact that the electronic device 200 is in a docked operating condition, the one or more processors (207) of the electronic device 200, in response, redirect one or more user interface controls (417) operable at a user interface of the electronic device 200, e.g., display 201, to a user interface of the wearable companion device defined by the smartwatch 100, one example of which in this case is the display 101 of the smartwatch 100.

At step 502, one or more sensors (115) of the smartwatch 100 detect a gesture translating the smartwatch 100 in three-dimensional space. As shown at steps 503, 504, in this illustration the gesture comprises moving the forearm from a vertical position to a horizontal position in three-dimensional space. At step 505, the electronic device 200 receives one or more application control signals (419) from the smartwatch 100 and controls the application streaming the content 414 being presented on the content presentation companion device 300 as a function of those application control signals (419). In this illustration, as shown at step 506, this control has resulted in the content 414 being presented on the content presentation companion device 300 being fast-forwarded from Amit roasting potatoes, cauliflower, and tomatoes to the portion of the content 414 being presented on the content presentation companion device 300 where Amit makes is garam marsala, which is rumored to be the best on earth.

Figure 6:
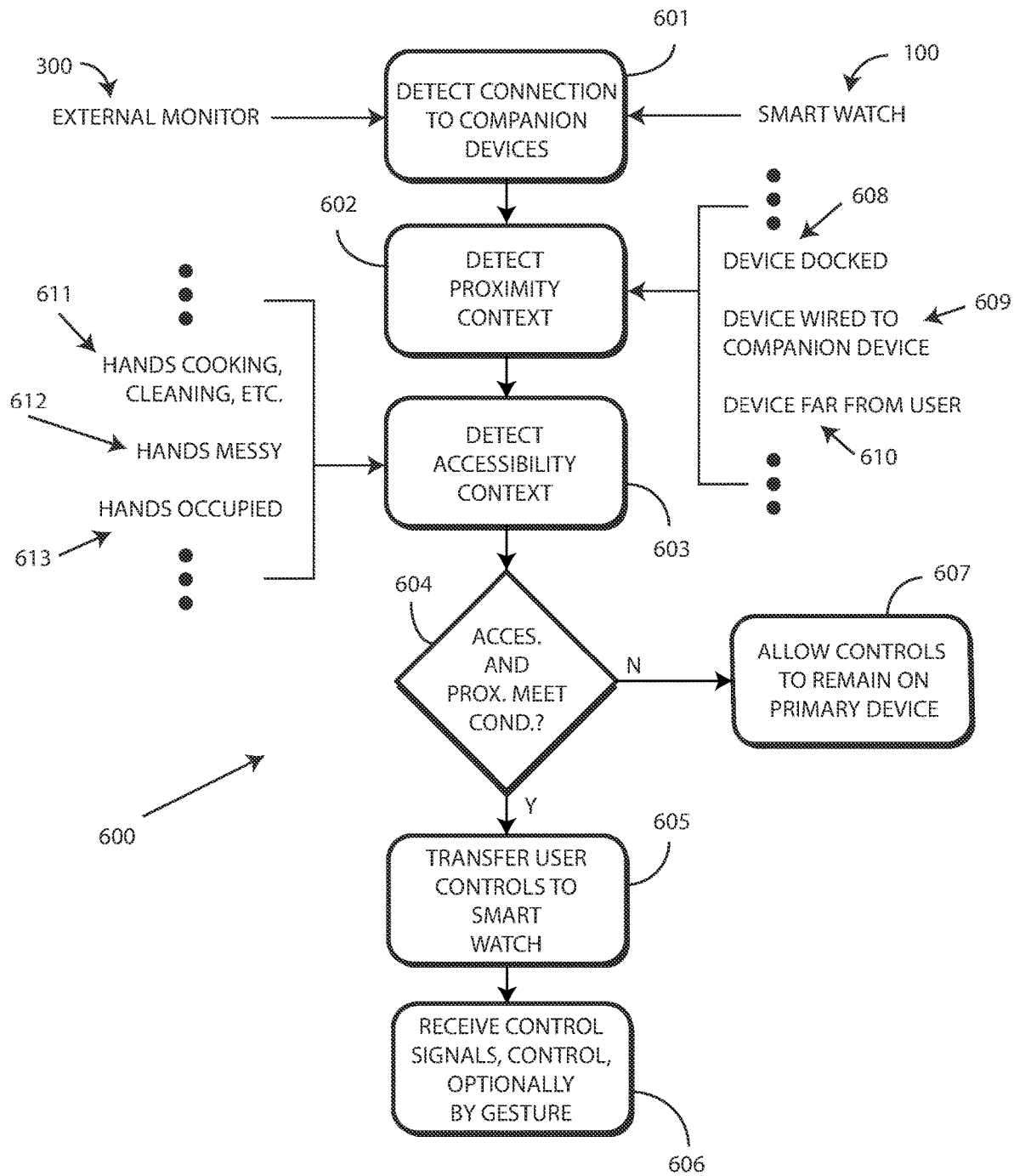
FIG. 6 illustrates another explanatory method in accordance with one or more embodiments of the disclosure.

Turning now to FIG. 6, illustrated therein is an alternate method 500 in accordance with one or more embodiments of the disclosure. Beginning at step 601, one or more processors of an electronic device detect an application operating on the electronic device presenting content on a content presentation companion device 300 operating as a primary display for the electronic device while the electronic device 200 is electronically in communication with a smartwatch 100.

At step 602, one or more sensors of the electronic device determine that a proximity context meets at least a first predefined criterion. Examples of the first predefined criterion shown in FIG. 6 include the electronic device being in a docked operating condition 608, being connected to the content presentation companion device 300 by a wired connection 609, or the electronic device being more than a predefined distance 610 from the user of the electronic device. Other examples of proximity contexts will be obvious to those of ordinary skill in the art having the benefit of this disclosure.

At step 603, one or more sensors of the electronic device determine that an accessibility context meets at least a second predefined criterion. Examples of the second predefined criterion include the hands of the user of the electronic device cooking, cleaning, or repairing 611, the hands of the user of the electronic device being unclean 612, or the hands of the user of the electronic device being occupied 613. Other examples of accessibility contexts will be obvious to those of ordinary skill in the art having the benefit of this disclosure.

Whether the at least one first predefined criterion and the at least one second predefined criterion are met is determined at decision 604. Where they are not, the user interface controls associated with the application operating on the electronic device and streaming the content to the content presentation companion device 300 remain on the electronic device at step 607.

However, where the at least one first predefined criterion and the at least on second predefined criterion are met, at step 605 the one or more processors of the electronic device dynamically redirect one or more user interface controls operable at the display of the electronic device to a user interface of the wearable electronic device defined by the smartwatch 100 at step 605.

At step 606, after the user interacts with the user interface controls, the electronic device receives one or more control signals from the wearable companion device defined by the smartwatch 100 and controls one or more control parameters of a presentation presented on the content presentation companion device 300 as a function of the one or more control signals. In one or more embodiments, the one or more control signals are initiated by actuation of at least one user interface controls of the one or more user interface controls at the user interface of the wearable companion device defined by the smartwatch 100. In other embodiments, the one or more control signals are initiated by a gesture translating the wearable companion device defined by the smartwatch 100 in three-dimensional space as described above with reference to FIG. 5. Of course, a combination of these control signal initiators could be used in other embodiments.

Figure 7:
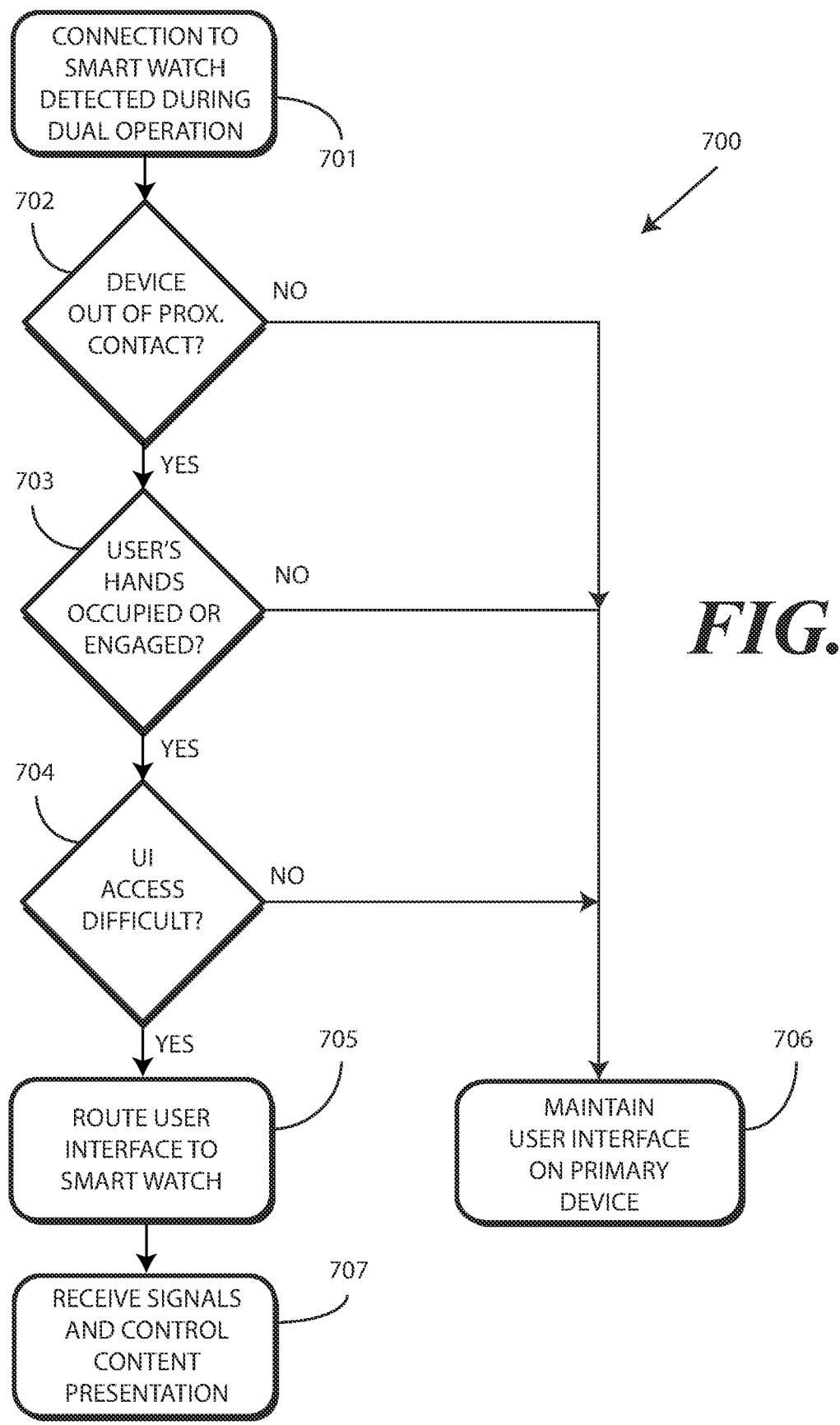
FIG. 7 illustrates another explanatory method in accordance with one or more embodiments of the disclosure.

Turning now to FIG. 7, illustrated therein is another method 700 in accordance with one or more embodiments of the disclosure. Beginning at step 701, one or more processors of an electronic device detect an application operating on an electronic device presenting content on a content presentation companion device operating as a primary display for the electronic device while the electronic device is electronically in communication with a wearable electronic device, one example of which is a smartwatch.

Decision 702 determines whether a proximity context matches at least a first predefined criterion, while decision 702 determines whether an accessibility context matches at least a second predefined criterion. In this example, decision 702 detects whether a condition exists where the electronic device is either connected to the content presentation companion device by a wire or is in a docked configuration. Decision 703 determines whether the hands of a user are occupied. Where these conditions are not met, redirection of user interface controls from the electronic device to the smartwatch is precluded at step 706 in one or more embodiments. Otherwise, the method 700 proceeds to decision 704.

Decision 704 determines whether these conditions disrupt the ability of the user of the electronic device to control the content being presented on the content presentation companion device using the user interface of the electronic device itself. Where it does not, as may be the case when the user is taking a break from their activity, redirection of user interface controls from the electronic device to the smartwatch is precluded at step 706 in one or more embodiments. Otherwise, at step 705 the one or more processors of the electronic device redirect one or more application controls to a user interface of the smartwatch.

At step 707, the electronic device receives, using a communication device, one or more application control signals from the smartwatch. At step 707, the electronic device controls the application by causing the content presented on the content presentation companion device to change as a function of the one or more application control signals. In one or more embodiments, the controlling occurring at step 707 alters a presentation of the content on the content presentation companion device in response to receiving the control signals. As noted above, the one or more first application control signals are initiated by either actuation of a user actuation target presented at the user interface of the smartwatch, translation of the smartwatch in three-dimensional space in accordance with a predefined gesture, combinations thereof, or other techniques.

Figure 8:
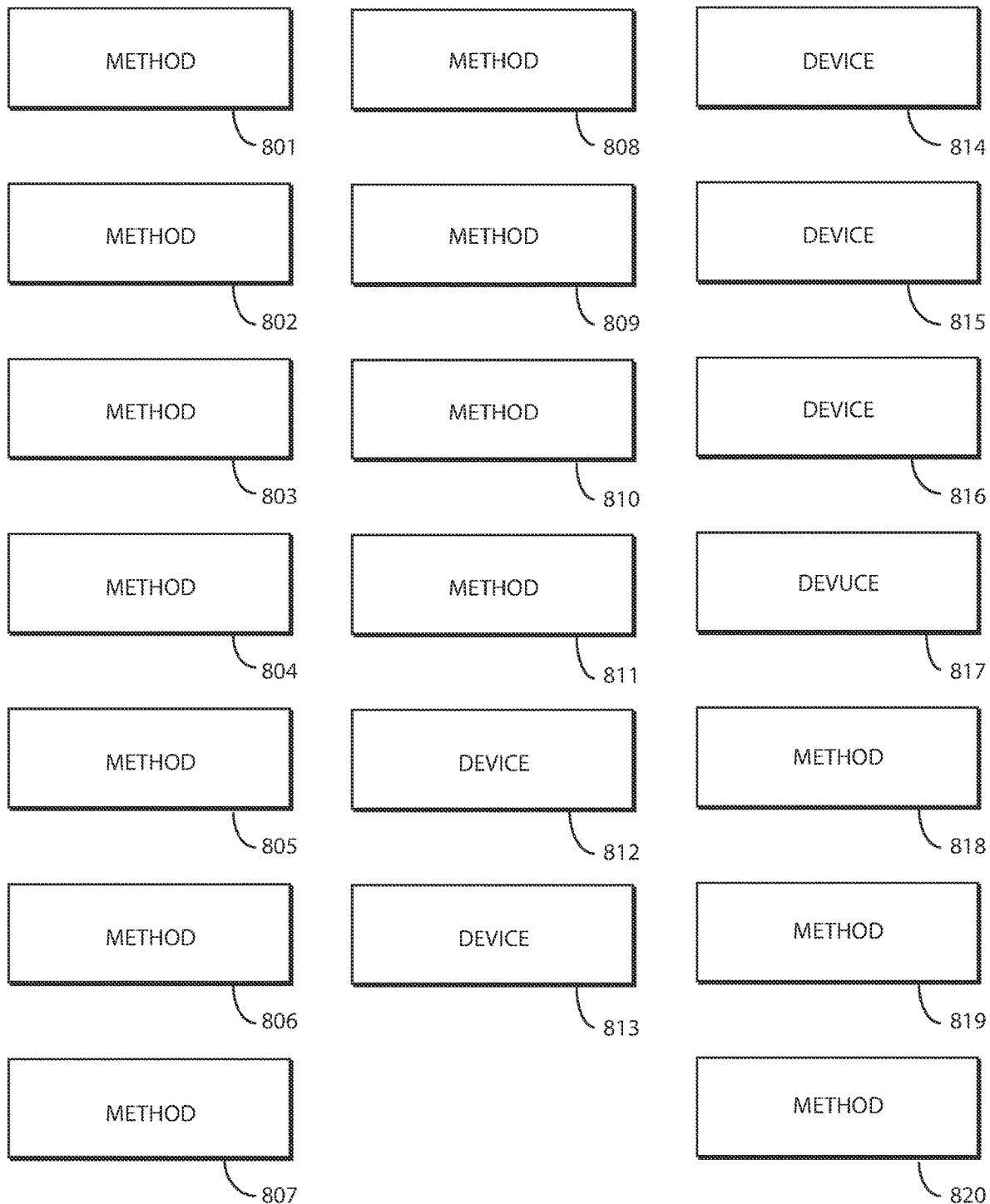
FIG. 8 illustrates various embodiments of the disclosure.

Turning now to FIG. 8, illustrated therein are various embodiments of the disclosure. The embodiments of FIG. 8 are shown as labeled boxes in FIG. 8 due to the fact that the individual components of these embodiments have been illustrated in detail in FIGS. 1-7, which precede FIG. 8. Accordingly, since these items have previously been illustrated and described, their repeated illustration is no longer essential for a proper understanding of these embodiments. Thus, the embodiments are shown as labeled boxes.

At 801, a method in an electronic device comprises detecting, with one or more processors, a communication device electronically in communication with both a content presentation companion device operating as a primary display for the electronic device and a wearable companion device. At 801, this detecting occurs while:

an application operating on the one or more processors presents content on the content presentation companion device;

one or more sensors of the electronic device determine an accessibility context of the electronic device meets at least a first predefined criterion; and the one or more sensors of the electronic device determine a proximity context of the electronic device meets at least a second predefined criterion.

At 801, in response to the detecting, the method comprises redirecting, with the one or more processors, one or more user interface controls from a user interface of the electronic device to a user interface of the wearable companion device while the accessibility context of the electronic device meets the at least a first predefined criterion and the proximity context of the electronic device meets the at least a second predefined criterion.

At 802, the at least a first predefined criterion of 801 comprises hands of a user of the electronic device being occupied. At 803, the at least a first predefined criterion of 801 comprises hands of a user of the electronic device being unclean.

At 804, the at least a second predefined criterion of 801 comprises the electronic device being in a docked operating condition. At 805, the at least a second predefined criterion of 801 comprises the communication device being connected to the content presentation companion device by a wired connection.

At 806, the method of 801 further comprises receiving, after the redirecting, one or more control signals from the wearable companion device and controlling one or more control parameters of the content presented on the content presentation companion device as a function of the one or more control signals. At 807, the one or more control signals 806 are initiated by actuation of at least one user interface control of the one or more user interface controls at the user interface of the wearable companion device.

At 808, the wearable companion device of 807 comprises a smartwatch. At 809. The one or more control signals of 808 are initiated by a gesture translating the smartwatch in three-dimensional space.

At 810, the method of 801 further comprises causing the user interface of the wearable companion device to present at least one preview image identifying the content concurrently with the one or more user interface controls. At 811, the application of 810 comprises a video streaming application.

At 812, an electronic device comprises at least one display and a communication device electronically communicating with both a content presentation companion device operating as a primary display for the electronic device and a wearable electronic device while an application operating on the electronic device is presenting content on the content presentation companion device. At 812, the electronic device comprises one or more sensors determining that an accessibility context of the electronic device meets at least a first predefined criterion that a proximity context of the electronic device meets at least a second predefined criterion At 812, the electronic device comprises one or more processors dynamically redirecting one or more user interface controls operable at the at least one display of the electronic device to a user interface of the wearable electronic device while the at least a first predefined criterion and the at least a second predefined criterion are met.

At 813, the electronic device of 812 comprises a smartphone and the wearable electronic device comprises a smartwatch. At 814, the one or more user interface controls of 813 comprise one or more of a stop user actuation target, a play user actuation target, an audio control user actuation target, a rewind user actuation target, and/or a fast forward user actuation target.

At 815, the communication device of the electronic device of 813 receives signals indicating actuation of at least one user interface control at the user interface of the smartwatch. At 815, the one or more processors control the content on the content presentation companion device in response to receiving the signals indicating the actuation of the at least one user interface control at the user interface of the smartwatch.

At 816, the communication device of the electronic device of 813 receives signals indicating translation of the smartwatch in three-dimensional space in accordance with a predefined gesture. At 816, the one or more processors control the content on the content presentation companion device in response to receiving the signals.

At 817, the at least a first predefined criterion of 812 comprises the electronic device being docked or connected to the content presentation companion device by a wire. At 817, the at least a second predefined criterion comprises hands of a user of the electronic device being occupied.

At 818, a method for an electronic device comprises detecting, by one or more processors, an application operating on the electronic device presenting content on a content presentation companion device operating as a primary display for the electronic device while the electronic device is electronically in communication with a smartwatch. At 818, the method comprises detecting, by one or more sensors, a condition where the electronic device is either connected to the content presentation companion device by a wire or is in a docked configuration while hands of a user of the electronic device are occupied. At 818, the method comprises redirecting one or more user interface controls to a user interface of the smartwatch while the condition occurs.

At 819, the method of 818 further comprises receiving, by a communication device of the electronic device, one or more user interface control signals from the smartwatch. At 819, the method comprises causing the content presented on the companion electronic device to change as a function of the one or more user interface control signals. At 820, the one or more user interface controls of 819 indicate that the smartwatch has been translated in three-dimensional space in accordance with a predefined gesture.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more processors, a communication device electronically in communication with both:
    a content presentation companion device operating as a primary display for the electronic device; and
    a wearable companion device;
    while:
        an application operating on the one or more processors presents content on the content presentation companion device;
        one or more sensors of the electronic device determine an accessibility context of the electronic device meets at least a first predefined criterion preventing a user from being able to interact with the electronic device; and
        the one or more sensors of the electronic device determine a proximity context of the electronic device meets at least a second predefined criterion; and
    in response to the detecting, redirecting, with the one or more processors, one or more user interface controls from a user interface of the electronic device to a user interface of the wearable companion device while the accessibility context of the electronic device meets the at least a first predefined criterion and the proximity context of the electronic device meets the at least a second predefined criterion.

2. The method of claim 1, the at least a first predefined criterion comprising hands of the user of the electronic device being occupied.

3. The method of claim 1, the at least a first predefined criterion comprising hands of the user of the electronic device being unclean.

4. The method of claim 1, the at least a second predefined criterion comprising the electronic device being in a docked operating condition.

5. The method of claim 1, the at least a second predefined criterion comprising the communication device being connected to the content presentation companion device by a wired connection.

6. The method of claim 1, further comprising receiving, after the redirecting, one or more control signals from the wearable companion device and controlling one or more control parameters of the content presented on the content presentation companion device as a function of the one or more control signals.

7. The method of claim 6, wherein the one or more control signals are initiated by actuation of at least one user interface control of the one or more user interface controls at the user interface of the wearable companion device.

8. The method of claim 7, wherein the wearable companion device comprises a smartwatch.

9. The method of claim 8, wherein the one or more control signals are initiated by a gesture translating the smartwatch in three-dimensional space.

10. The method of claim 1, further comprising causing the user interface of the wearable companion device to present at least one preview image identifying the content concurrently with the one or more user interface controls.

11. The method of claim 10, wherein the application comprises a video streaming application.

12. An electronic device, comprising:
at least one display;
an image capture device;
a communication device electronically communicating with both a content presentation companion device operating as a primary display for the electronic device and a wearable electronic device while an application operating on the electronic device is presenting content on the content presentation companion device;
one or more sensors determining that an accessibility context of the electronic device meets at least a first predefined criterion when image data captured by the image capture device indicates that hands of a user are occupied or unclean and a proximity context of the electronic device meets at least a second predefined criterion; and
one or more processors dynamically redirecting one or more user interface controls operable at the at least one display of the electronic device to a user interface of the wearable electronic device while the at least a first predefined criterion and the at least a second predefined criterion are met.

13. The electronic device of claim 12, wherein the electronic device comprises a smartphone and the wearable electronic device comprises a smartwatch.

14. The electronic device of claim 13, wherein the one or more user interface controls comprise one or more of a stop user actuation target, a play user actuation target, an audio control user actuation target, a rewind user actuation target, and/or a fast forward user actuation target.

15. The electronic device of claim 13, the communication device receiving signals indicating actuation of at least one user interface control at the user interface of the smartwatch and the one or more processors controlling the content on the content presentation companion device in response to receiving the signals indicating the actuation of the at least one user interface control at the user interface of the smartwatch.

16. The electronic device of claim 13, the communication device receiving signals indicating translation of the smartwatch in three-dimensional space in accordance with a predefined gesture and the one or more processors controlling the content on the content presentation companion device in response to receiving the signals.

17. The electronic device of claim 12, wherein the at least a second predefined criterion comprises the electronic device being docked or connected to the content presentation companion device by a wire.

18. A method for an electronic device, the method comprising:
detecting, by one or more processors, an application operating on the electronic device presenting content on a content presentation companion device operating as a primary display for the electronic device while the electronic device is electronically in communication with a smartwatch;
detecting, by one or more sensors, a condition where the electronic device is either connected to the content presentation companion device by a wire or is in a docked configuration while hands of a user of the electronic device are occupied; and
redirecting one or more user interface controls to a user interface of the smartwatch while the condition occurs.

19. The method of claim 18, further comprising receiving, by a communication device of the electronic device, one or more user interface control signals from the smartwatch and causing the content presented on the content presentation companion device to change as a function of the one or more user interface control signals.

20. The method of claim 19, wherein the one or more user interface control signals indicate that the smartwatch has been translated in three-dimensional space in accordance with a predefined gesture.

* * * * *